US009972841B2

United States Patent
Kwak et al.

(10) Patent No.: US 9,972,841 B2
(45) Date of Patent: May 15, 2018

(54) POSITIVE ELECTRODE ACTIVE MATERIAL AND PREPARATION METHOD THEREOF

(71) Applicant: LG Chem, Ltd., Seoul (KR)

(72) Inventors: Ick Soon Kwak, Daejeon (KR); Seung Beom Cho, Daejeon (KR); Yeo June Yoon, Daejeon (KR)

(73) Assignee: LG Chem, Ltd. (KR)

( * ) Notice: Subject to any disclaimer, the term of this patent is extended or adjusted under 35 U.S.C. 154(b) by 228 days.

(21) Appl. No.: 15/037,218

(22) PCT Filed: Sep. 25, 2015

(86) PCT No.: PCT/KR2015/010183
§ 371 (c)(1),
(2) Date: May 17, 2016

(87) PCT Pub. No.: WO2016/052944
PCT Pub. Date: Apr. 7, 2016

(65) Prior Publication Data
US 2016/0301069 A1 Oct. 13, 2016

(30) Foreign Application Priority Data

Sep. 30, 2014 (KR) ........................ 10-2014-0131747
Sep. 24, 2015 (KR) ........................ 10-2015-0135492

(51) Int. Cl.
| | | |
|---|---|---|
| H01M 4/48 | (2010.01) | |
| H01M 4/36 | (2006.01) | |
| H01M 4/485 | (2010.01) | |
| H01M 4/131 | (2010.01) | |
| H01M 4/50 | (2010.01) | |
| H01M 4/52 | (2010.01) | |
| H01M 4/525 | (2010.01) | |
| H01M 4/505 | (2010.01) | |
| H01M 10/0525 | (2010.01) | |
| H01M 4/62 | (2006.01) | |
| H01M 4/04 | (2006.01) | |
| H01M 4/1391 | (2010.01) | |
| H01M 10/052 | (2010.01) | |

(52) U.S. Cl.
CPC ......... *H01M 4/483* (2013.01); *H01M 4/0471* (2013.01); *H01M 4/131* (2013.01); *H01M 4/1391* (2013.01); *H01M 4/366* (2013.01); *H01M 4/48* (2013.01); *H01M 4/485* (2013.01); *H01M 4/525* (2013.01); *H01M 4/62* (2013.01); *H01M 4/624* (2013.01); *H01M 10/052* (2013.01); *H01M 4/505* (2013.01); *H01M 10/0525* (2013.01)

(58) Field of Classification Search
CPC ........... H01M 10/052; H01M 10/0525; H01M 4/0471; H01M 4/131; H01M 4/1391; H01M 4/366; H01M 4/48; H01M 4/483; H01M 4/485; H01M 4/505; H01M 4/525; H01M 4/62; H01M 4/624
See application file for complete search history.

(56) References Cited

U.S. PATENT DOCUMENTS

| | | |
|---|---|---|
| 2001/0053480 A1 | 12/2001 | Koga et al. |
| 2005/0208380 A1 | 9/2005 | Park et al. |
| 2005/0271944 A1 | 12/2005 | Suhara et al. |
| 2011/0274977 A1 | 11/2011 | Nakura |

FOREIGN PATENT DOCUMENTS

| | | |
|---|---|---|
| CN | 103647073 A | 3/2014 |
| EP | 3188291 A1 | 7/2017 |
| JP | 2001202960 A | 7/2001 |
| JP | 2012138197 A | 7/2012 |
| JP | 2012169217 A | 9/2012 |
| KR | 10-0277796 B1 | 10/2000 |
| KR | 20070008115 A | 1/2007 |
| KR | 20120012628 A | 2/2012 |
| KR | 20140023861 A | 2/2014 |
| WO | 2014027869 A2 | 2/2014 |

OTHER PUBLICATIONS

International Search Report from PCT/KR2015/010183, dated Jan. 15, 2016.
Cui, Yan, et al., "Improved electrochemical performance of La0.7Sr0.3MnO3 and carbon co-coated LiFePO4 synthesized by freeze-drying process." Electrochimica Acta, 2010, vol. 55, No. 3, pp. 922-926.
Supplementary European Search Report for Application No. 15846391 dated Jul. 24, 2017, 3 pages.

*Primary Examiner* — Carlos Barcena
(74) *Attorney, Agent, or Firm* — Lerner, David, Littenberg, Krumholz & Mentlik, LLP

(57) ABSTRACT

The present invention provides a positive electrode active material which includes a lithium transition metal oxide particle, composite particles, and at least one kind of conductive oxide particle on the lithium transition metal oxide particle surface, and also provides a preparation method for the positive electrode active material. The positive electrode active material includes lithium transition metal oxide particles and particular conductive oxide particles and composite particles which have a single phase, and thus the positive electrode active material not only has superb electronic conductivity, while having excellent ion transfer capability which allows transfer of metal ions such as lithium ions to lithium transition metal oxide particles, but may also minimize capacity reduction and output reduction in a secondary battery.

30 Claims, 10 Drawing Sheets

US 9,972,841 B2

POSITIVE ELECTRODE ACTIVE MATERIAL AND PREPARATION METHOD THEREOF

CROSS-REFERENCE TO RELATED APPLICATION(S)

The present application is a national phase entry under 35 U.S.C. § 371 of International Application No. PCT/KR2015/010183, filed on Sep. 25, 2015, which claims the benefit of Korean Patent Application Nos. 10-2014-0131747, filed on Sep. 30, 2014, and 10-2015-0135492, filed on Sep. 24, 2015, the entire contents of which are hereby incorporated by reference.

TECHNICAL FIELD

The present invention relates to a positive electrode active material, a preparation method thereof, and a lithium secondary battery which includes the positive electrode active material.

BACKGROUND ART

Lithium secondary batteries are small, lightweight, high capacity batteries which have been widely used as a power source for mobile devices since 1991. Recently, with rapid advancements in the electronics, communications, and computer industries, camcorders, mobile phones, notebook PCs, and the like, have appeared and continue to advance at an incredible pace. The demand for lithium secondary batteries as a power source for driving such mobile electronic communication devices continues to increase.

Lithium secondary batteries are limited in that lifetime rapidly decreases with repeated charging and discharging. In particular, this limitation is more severe at high temperatures. This is because electrolyte breaks down or active material degrades due to effects such as moisture inside of the battery, etc., or because of phenomena which occurs as the internal resistance of the battery increases.

Examples of lithium secondary battery positive electrode active materials which are being researched and developed accordingly include lithium nickel oxide ($LiNiO_2$), lithium manganese oxide ($LiMn_2O_4$), lithium iron phosphate ($LiFePO_4$), and lithium nickel cobalt manganese oxide ($Li(Ni_xCo_yMn_z)O_2$). However, in the case of $LiNiO_2$, not only is synthesis difficult, but there is a limitation in thermal stability, and thus commercialization is difficult. In the case of $LiMn_2O_4$, although there has been some commercialization of low-priced products, lifetime properties are poor due to structural distortion caused by $Mn^{3+}$ (Jahn-Teller distortion). In addition, although $LiFePO_4$ has low cost and good stability and is thus being extensively researched for use in hybrid electric vehicles (HEV), application in other areas is currently limited due to a low conductivity.

Consequently, $Li(Ni_xCo_yMn_z)O_2$ has recently been the most prominent among positive electrode active materials which are being considered as a replacement for $LiCoO_2$. Such material is more inexpensive than $LiCoO_2$ and has advantages of high-capacity and of being able to be used at high voltage, but has disadvantages of poor rate capability and poor lifetime properties at high temperature. Extensive research, such as on a method for coating surfaces of electrode active material with metal oxide coating layers, has been carried out to overcome such limitations.

For example, Korean Patent No. 10-277796 discloses a technique for coating metal oxide by coating metals such as magnesium (Mg), aluminum (Al), cobalt (Co), potassium (K), sodium (Na), calcium (Ca), etc., on the surface of positive electrode active material and then performing heat treatment in an oxidizing atmosphere.

However, there still remain difficulties in overcoming the limitations of reaction between electrolyte and positive electrode active material, and structural transitions on the surface of positive electrode active materials due to the existence of impurities on the surface of positive electrode active materials. Consequently, there is a demand for a positive electrode active material which is capable of minimizing reduction in capacity or output and improving lifetime properties in secondary batteries by reducing addition reactions of electrolyte and active material during charging and discharging, and reducing the internal resistance of the battery.

PRIOR ART DOCUMENT

Patent Document

Korean Patent No. 10-277796

DISCLOSURE OF THE INVENTION

Technical Problem

A first technical objective of the present invention is to provide a positive electrode active material which has excellent conductivity and whose interface reaction with electrolyte solution is suppressed, and which may thereby improve the output and cycle properties of a secondary battery.

A second technical objective of the present invention is to provide a method for economically and easily preparing the positive electrode active material.

A third technical objective of the present invention is to provide a positive electrode which includes the positive electrode active material.

A fourth technical objective of the present invention is to provide a lithium secondary battery which includes the positive electrode.

Technical Solution

To overcome such above limitations, the present invention provides a positive electrode active material including lithium transition metal oxide particles and conductive oxide particles, the conductive oxide particles being any one selected from a group which consists of indium tin oxide (ITO) and antimony tin oxide (ATO), or a mixture of at least two thereof.

In addition, the present invention, according to an embodiment, provides a method for preparing a positive electrode active material which includes mixing and heat treating lithium transition metal oxide particles and conductive oxide particles, the conductive oxide particles being any one selected from a group which consists of indium tin oxide (ITO) and antimony tin oxide (ATO), or a mixture of at least two thereof.

Moreover, the present invention provides a positive electrode which includes the positive electrode active material.

Furthermore, the present invention provides a lithium secondary battery which includes the positive electrode.

Advantageous Effects

A positive electrode active material according to an embodiment of the present invention includes lithium transition metal oxide particles and particular conductive oxide particles which have a single phase, and thus the positive electrode active material not only has superb electronic conductivity, while having excellent ion transfer capability which allows transfer of metal ions such as lithium ions to lithium transition metal oxide particles, but may also minimize capacity reduction and output reduction in a secondary battery.

Moreover, since there is a shock absorbing effect when producing positive electrodes, in particular during a pressing operation, due to structural properties of the conductive oxide particles, fracturing of positive electrode active material may be minimized. Consequently, when applied to secondary batteries, lifetime properties may be further improved.

In addition, according to a preparation method in accordance with an embodiment of the present invention, a positive electrode active material may be easily and economically prepared by using pre-formed nano-sized oxide particles, which are not in the form of precursors, in a simple heat treatment of nano-sized oxide particles at the exterior, interior, or exterior and interior of lithium transition metal oxide.

BRIEF DESCRIPTION OF THE DRAWINGS

The following drawings accompanying the present specification are examples of exemplary embodiments of the present invention, and are provided to provide better understanding of the descriptions and technical scope of the invention, and thus the present invention should not be construed as limited to that which is set forth in the drawings.

MODE FOR CARRYING OUT THE INVENTION

Figure 1:
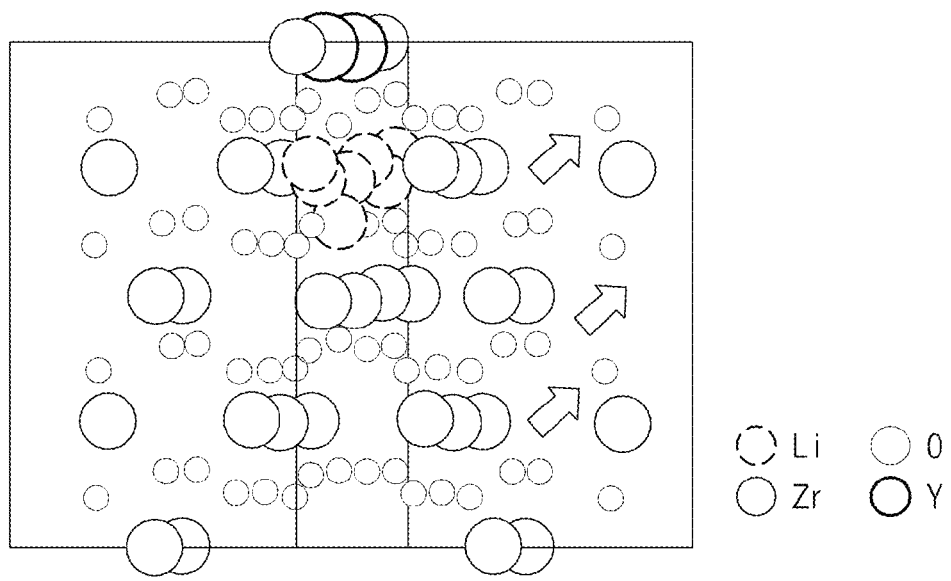
FIG. 1 illustrates predictive modeling of the pathway of lithium in an yttria stabilized zirconia (YSZ) composite particle which was optimized through Discrete Fourier Transformation (DFT) structure optimization.

Hereinafter, the present invention is described in greater detail in order to provide better understanding thereof.

Terms used in the present specification and claims should not be construed as limited to their typical or dictionary definitions. Rather, based on the principle that the concepts of terms may be appropriately defined by the inventor in such a way which best describes the invention, the terms should only be construed as definitions and concepts which are in accordance with the technical scope of the present invention.

A positive electrode active material according to an embodiment of the present invention includes lithium transition metal oxide particles and conductive oxide particles, the conductive oxide particles being any one selected from a group which consists of indium tin oxide (hereinafter, ITO) and antimony tin oxide (hereinafter, ATO), or a mixture of at least two thereof.

Moreover, the positive electrode active material according to an embodiment of the present invention may include the conductive oxide particles which have a single-phase peak when measured by x-ray diffraction analysis.

The positive electrode active material according to an embodiment of the present invention includes the lithium transition metal oxide particles and specific conductive oxide particles which have a single phase, and thus not only has superb electronic conductivity while having excellent ion transfer capability which allows transfer of metal ions such as lithium ions to the lithium transition metal oxide particles, but may also minimize capacity reduction and output reduction in secondary batteries.

Moreover, since there is a shock absorbing effect when producing positive electrodes, in particular during a pressing operation, due to structural properties of the conductive oxide particles, fracturing of the positive electrode active material may be minimized so that, when applied to the secondary batteries, the lifetime properties may be further improved.

According to an embodiment of the present invention, the conductive oxide particles may include any one, or a mixed oxide of two or more kinds, selected from a group which consists of ITO and ATO, and is desirably ATO alone, or a mixed conductive oxide which includes ATO.

When the mixed conductive oxide is used, the content ratio of the ITO to the ATO may be a weight ratio of about 1:0.01 to about 1:1, and desirably a weight ratio of about 1:0.1 to about 1:0.5.

In the positive electrode active material according to an embodiment of the present invention, the ATO may include any one of compounds represented by the below Formula 1 or 2, or include a mixture thereof.

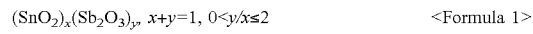
$(SnO_2)_x(Sb_2O_3)_y$, $x+y=1$, $0<y/x\leq 2$  <Formula 1>

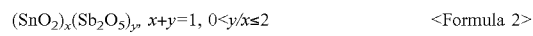
$(SnO_2)_x(Sb_2O_5)_y$, $x+y=1$, $0<y/x\leq 2$  <Formula 2>

Here, in the above formulas, x is desirably about 0.6 to about 0.99, and y may be about 0.001 to about 0.2, and more desirably about 0.002 to about 0.1.

In the positive electrode active material according to an embodiment of the present invention, the ITO may include any one of compounds represented by the below Formula 3 or 4, or include a mixture thereof.

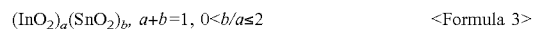
$(InO_2)_a(SnO_2)_b$, $a+b=1$, $0<b/a\leq 2$  <Formula 3>

$(InO_2)_a(SnO_2)_b$, $a+b=1$, $0<b/a\leq 2$  <Formula 4>

Here, in the above formulas, a is desirably about 0.6 to about 0.99, and b may be about 0.001 to about 0.2, and more desirably about 0.002 to about 0.1.

The ITO used in the present invention, which is material synthesized from indium oxide and tin oxide, is characterized by having both high electrical conductivity and optical transparency, and has electrical properties of having high transmittance and low electrical resistivity.

Moreover, the ATO, which is tin oxide that is coated with antimony oxide, is more economical than the ITO with respect to cost, and has advantages of excellent transparency and conductivity.

Specifically, the ATO is capable of existing in the particle as $Sb^{3+}$ or $Sb^{5+}$, and may generate oxygen vacancies when existing as $Sb^{3+}$. The oxygen vacancies generated as such may cause an increase in ionic conductivity. Thus, when both ionic conductivity and electrical conductivity are created and included in the exterior, interior, or exterior and interior of the particles in the positive electrode active material, the rate capability and output property of the secondary battery may be improved.

The positive electrode active material may include the conductive oxide, that is, ATO or ITO, which has a single-phase peak when measured by XRD analysis. This may indicate that, even after undergoing heat treatment, the conductive oxide included in the coating layer is not phase separated, and thus the original structure of the oxide in the positive electrode active material is maintained.

According to the positive electrode active material in accordance with an embodiment of the present invention, the average particle diameter of the conductive oxide particle may be about 1 nm to about 100 nm, desirably about 5 nm to about 80 nm, and more desirably about 10 nm to about 60 nm.

The positive electrode active material according to a first embodiment of the present invention includes the lithium transition metal oxide particles and conductive oxide particles, and the conductive oxide particles may be coated on the outer surface of the lithium transition metal oxide particles to form a coating layer.

According to an embodiment of the present invention, the coating layer may be formed as a single layer of the conductive oxide particles, and thus have a coating layer thickness of about 1 nm to about 100 nm, which is the same or similar to the average particle diameter of the conductive oxide particles.

When the coating layer is multi-layered, the coating layer thickness increases such that the coating layer hinders movement of lithium ions, and thus there may be a limitation of degradation in output property. When the coating layer is thicker than about 100 nm, the thick coating layer may act as resistance, and thus there may be limitations such as an occurrence of overvoltage, a reduction in output, etc.

Therefore, in the present invention, in accordance with an embodiment, it is desirable with respect to initial capacity and output for the conductive oxide particle which has the average particle diameter of about 1 nm to about 100 nm to be formed as a single layer, and the thickness may desirably be about 5 nm to about 80 nm, and more desirably about 10 nm to about 60 nm.

The positive electrode active material according to a second embodiment of the present invention may include the lithium transition metal oxide particles and conductive oxide particles, and the conductive oxide particles may be included in the interior of the lithium transition metal oxide particle.

In the positive electrode active material according to an embodiment of the present invention, the conductive oxide particles are included in the interior of the lithium transition metal oxide particle, and thus form a composite material with the lithium transition metal oxide particle. Consequently, collapsing of the crystal structure of the positive electrode active material is prevented, and thus the structural stability and electrochemical properties may be improved.

Describing in detail, according to an embodiment of the present invention, the conductive oxide particles have a concentration gradient in which the concentration decreases going from the surface of the lithium transition metal oxide particle to the interior, and may be composited with the lithium transition metal oxide particle to form the composite material.

For example, in the positive electrode active material of the present invention, the content of the conductive oxide particles in an exterior bulk of the lithium transition metal oxide particle may be at least about 20% higher than in an interior bulk of the lithium transition metal oxide particle, and the interior bulk may denote the center and adjacent regions of the lithium transition metal oxide particle which include about 50% of the total number of transition metal atoms in the particle.

According to an embodiment of the present invention, the conductive oxide particles may be included within a thickness range of about 0.0001 to about 80% of the particle radius from the surface of the lithium transition metal oxide particle.

The positive electrode active material according to a third embodiment of the present invention may include the lithium transition metal oxide particles and conductive oxide particles, the conductive oxide particles being coated on the outer surface of the lithium transition metal oxide particle to form a coating. In the interior of the lithium transition metal oxide particle, the conductive oxide particles may be included with the lithium transition metal oxide particle.

The conductive oxide particles have a concentration gradient which decreases going from the surface of the lithium transition metal oxide particle to the interior, and may be composited with the lithium transition metal oxide particle to form the composite material.

According to an embodiment of the present invention, the conductive oxide particles may be included in an amount of about 50 to about 30000 ppm with respect to the entirety of the positive electrode active material, and may desirably be included in an amount of about 100 to about 20000 ppm.

The average particle diameter of the positive electrode active material is appropriately about 3 to about 30 μm.

Moreover, the positive electrode active material according to an embodiment of the present invention may further include composite particles. The composite particles may be included, along with or separate from the conductive oxide particles, in the exterior, interior, or exterior and interior of the lithium transition metal oxide particles.

As such, the mixing (content) ratio of the conductive oxide particles to the composite particles may be a weight ratio of about 1:0.01 to about 1:1.5, desirably about 1:0.1 to about 1:1. When within such the weight ratio, structural advantages of the composite particles may be maximized and also the shock absorbing effect of the positive electrode active material may be maximized, and thereby a fracturing effect may be reduced, and a decrease in relative conductivity may be prevented so that degradation in output or capacity is prevented.

The composite particle may include any one selected from a group which consists of yttria stabilized zirconia (YSZ), gadolinia-doped ceria (GDC), lanthanum strontium gallate magnesite (LSGM), lanthanum strontium manganite (LSM), Ca doped zirconia or CaO-stabilized zirconia (CSZ), Sc doped zirconia (SSZ), and Ni—YSZ, or include a mixture of at least two kinds from among the group, and such as in the case of the conductive oxide particles, the composite particles include a single-phase peak when measured by XRD analysis.

The positive electrode active material according to an embodiment of the present invention may include lithium transition metal oxide particles and certain conductive oxide particles which have a single phase, in particular, both conductive oxide particles and composite particles, to thereby minimize capacity reduction and output reduction in the secondary battery. In addition, due to the structural properties of the composite particles, the positive electrode active material may have a shock-absorbing effect during production of the positive electrode, in particular, during the pressing operation, and thus a fracturing effect of the positive electrode active material may be minimized. Therefore, applying the positive electrode active material in the secondary battery may further improve the lifetime properties.

The YSZ, which is yttria stabilized zirconia, is a ceramic material which is made to be stable at room temperature by adding yttrium oxide (yttria) to zirconium oxide (zirconia). In the YSZ, yttria is added to zirconia, such that some of $Zr^{4+}$ ions are substituted by $Y^{3+}$. Consequently, instead of four $O^{2-}$ ions, there are three $O^{2-}$ ions, and thereby the oxygen vacancy may be generated. Due to the oxygen vacancy generated as such, YSZ obtains $O^{2-}$ ionic conductivity, and conductivity improves as temperature increases. Such properties may be usefully applied in solid oxide fuel cells (SOFC) which operate at high temperature.

The LSGM, which is lanthanum-strontium-gallium-magnesium oxide (LaSrGaMg), has high ionic conductivity, and thus, is material which may reduce the operating temperature of the solid oxide fuel cells.

The GDC, which is ceria doped with gadolinium (Gd), may be, for example, $Gd_{0.1}Ce_{0.9}O_{1.95}$, and, as does LSGM, has high ionic conductivity.

The LSM, which is a manganite perovskite structure, has, for example, LaSrMnO or $La_{(1-x)}Sr_xMnO_3$ ($0.01 \leq x \leq 0.30$) perovskite structure, almost no ionic conductivity, and superb electronic conductivity. LSM may be $La_{1-x}Sr_xM-n_yO_{3-\delta}$ ($1 \geq X \geq 0.05$, $0.95 \leq y \leq 1.15$) ($\delta$ is defined as a value which indicates a small deviation from perfect stoichiometry).

SSZ may be $(ZrO_2)_{1-2x}(Sc_2O_3)_x$, $(ZrO_2)_{1-2x}(Sc_2O_3)_{x-z}(Y_2O_3)_z$, or $(ZrO_2)_{1-2x-z}(Sc_2O_3)(CeO_2)_z(0 \leq x \leq 0.25, 0 < z \leq 0.1)$.

The CSZ may be zirconia doped with calcium, or calcia-stabilized zirconia (CaO-stabilized zirconia), and the thermal stability of zirconia may be improved by adding calcia. The CSZ is a state in which cubic crystal structure and tetragonal crystal structure are mixed. The tetragonal crystal structure changes into the cubic crystal structure when temperature increases, and changes back into the tetragonal crystal structure when temperature decreases. During such the process of the crystal structure being changed, expansion and contraction of the volume may be repeated.

In the positive electrode active material according to an embodiment of the present invention, the composite particles, YSZ, GDC, LSGM, LSM, CSZ, SSZ, and Ni—YSZ, may have the property of having a single phase.

In the positive electrode active material according to an embodiment of the present invention, the composite particles may desirably be any one selected from a group which consists of YSZ, CSZ, and SSZ, which are zirconia based, or the composite particles may desirably be a mixture of two or more kinds from among the group.

Specifically, the YSZ may be $Zr_{(1-x)}Y_xO_{2-x/2}$, in which $0.01 \leq x \leq 0.30$, and desirably, $0.03 \leq x \leq 0.20$.

The SSZ may desirably be $(ZrO_2)_{1-2x}(Sc_2O_3)$, $(ZrO_2)_{1-2x}(Sc_2O_3)_{x-z}(Y_2O_3)_z$, or $(ZrO_2)_{1-2x-z}(Sc_2O_3)_x(CeO_2)_z$ ($0.01 \leq x \leq 0.2$, $0.01 \leq z \leq 0.1$).

The CSZ may desirably include CSZ in which CaO content is about 2 wt % to about 17 wt % with respect to the total weight of CSZ.

The positive electrode active material according to an embodiment of the present invention includes lithium transition metal oxide particles, conductive oxide particles, and composite particles. The composite particles may be included along with or separate from the conductive oxide particles, in the exterior, interior, or exterior and interior of the lithium transition metal oxide particle.

Specifically, when the composite particles are, for example, YSZ, and the YSZ is included in the exterior of the lithium transition metal oxide, Y may enter Zr sites to first form a single phase, and since the positive electrode active material structure has a superstructure, oxygen vacancies may be generated in the interior of the structure so that numerous pores appear on the surface of the positive electrode active material.

Figure 2:
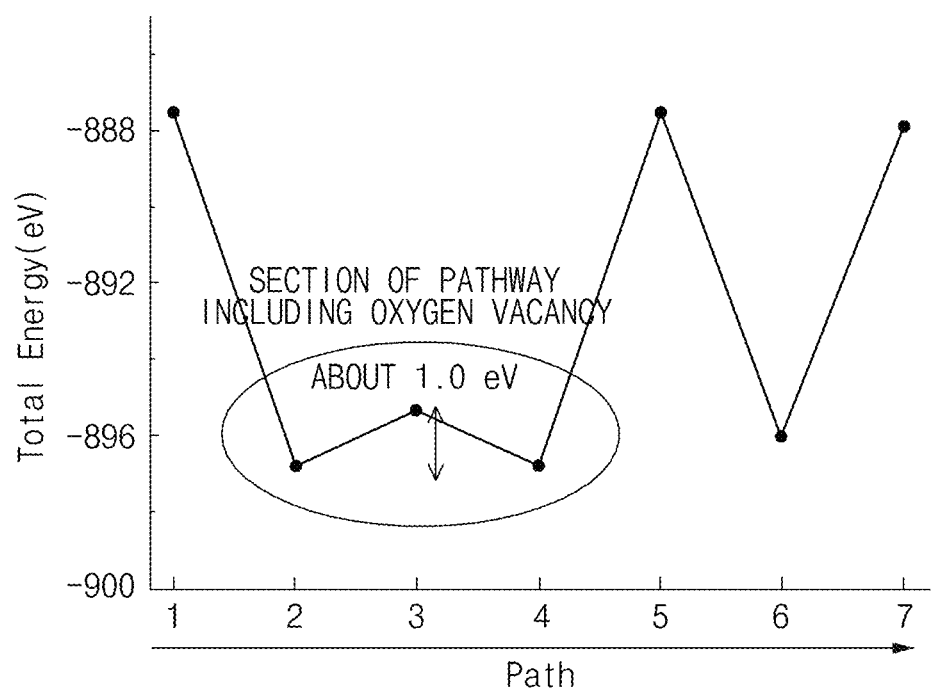
FIG. 2 is a graph analyzing ionic conductivity according to oxygen vacancies in an yttria stabilized zirconia (YSZ) composite particle which was optimized through Discrete Fourier Transformation (DFT) structure optimization.
Figure 3:
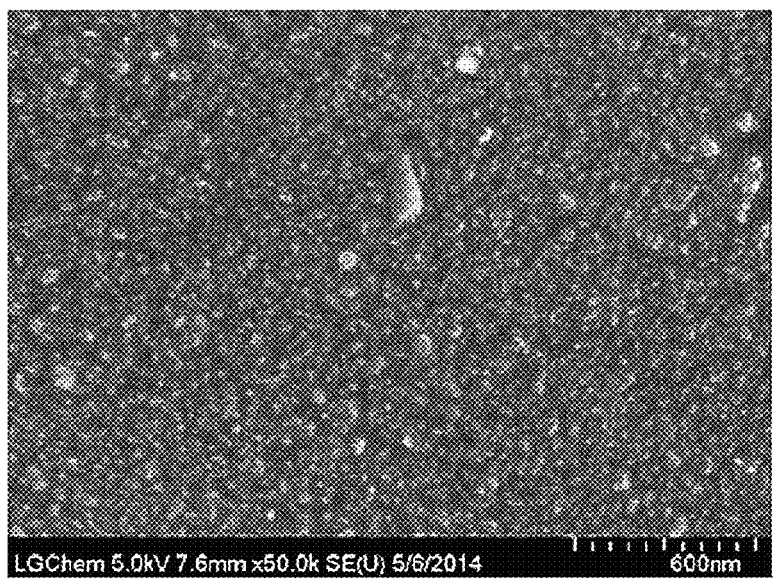
FIG. 3 is a scanning electron microscope (SEM) image of Example 1 of the present invention.
Figure 4:
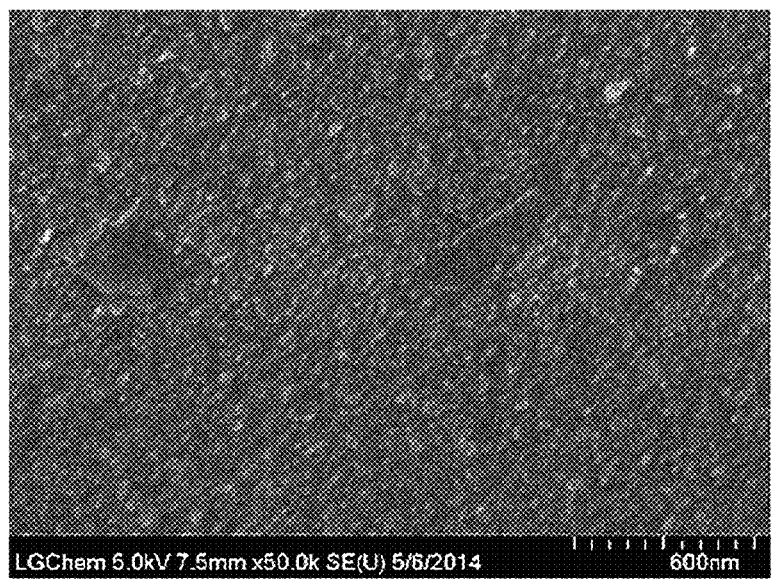
FIG. 4 is a scanning electron microscope (SEM) image of Example 2 of the present invention.
Figure 5:
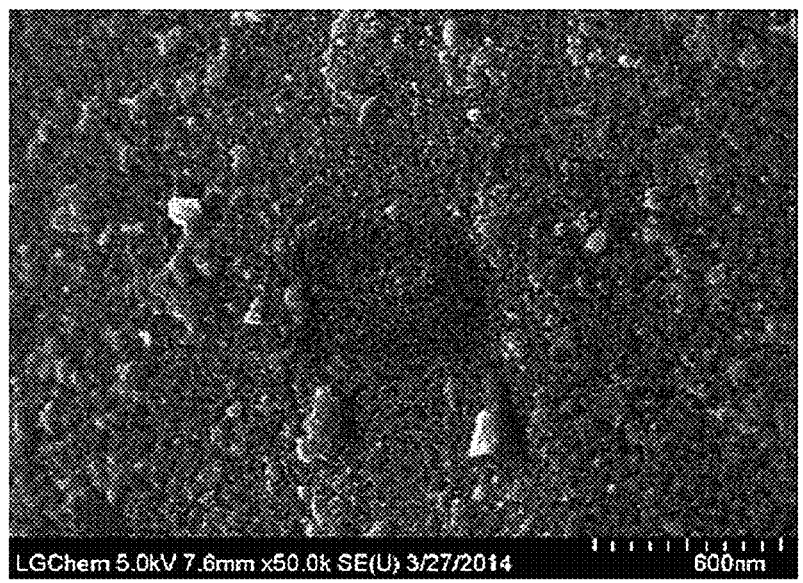
FIG. 5 is a scanning electron microscope (SEM) image of Comparative Example 1.
Figure 6:
FIG. 6 is a scanning electron microscope (SEM) image of Comparative Example 2.
Figure 7:
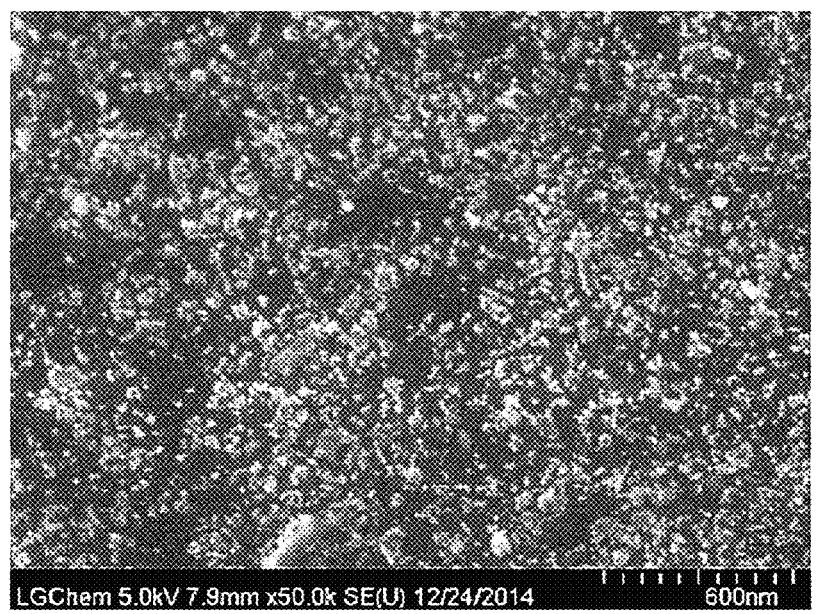
FIG. 7 is a scanning electron microscope (SEM) image of Comparative Example 3.

FIGS. 1 and 2 are predictive modeling of the pathway of lithium in the composite particle, yttria stabilized zirconia (YSZ), which was optimized through Discrete Fourier Transformation (DFT) structure optimization of the YSZ which is included in the positive electrode active material according to an embodiment of the present invention, and comparative analysis of the ionic conductivity of the lithium ion.

As observed in FIG. 1, by observing the pathway of lithium in the optimized YSZ, it may be known that, due to pores resulting from the oxygen vacancies in the interior of the structure of the YSZ, much space is created on the positive electrode active material surface, through which Li may escape.

Moreover, as in FIG. 2, the pathway in the YSZ through which the lithium ion can pass is found through DFT and the ionic conductivity of the lithium ions is analyzed, and thereby an energy difference of about 1.0 eV may be observed in the Path 2-3-4 section in FIG. 2.

Therethrough, when the pathway which has oxygen vacancies is connected, the lithium ion conductivity may be very high, and when the positive electrode active material which includes the composite particle YSZ through such oxygen vacancies is applied to the secondary battery, capacity reduction or output reduction may be minimized.

The positive electrode active material according to an embodiment of the present invention may further include an oxide which includes one or more element from among Ca, Nb, W, Mg, Ti, B, Mo, or Zr in the coating layer.

The oxide which includes one or more element from among Ca, Nb, W, Mg, Ti, B, Mo, or Zr may be included in the coating layer in an amount of about 50 ppm to about 30000 ppm.

Moreover, in the positive electrode active material according to an embodiment of the present invention, the lithium transition metal oxide particles may include the compound of the following Formula 5:

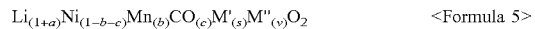

$$Li_{(1+a)}Ni_{(1-b-c)}Mn_{(b)}CO_{(c)}M'_{(s)}M''_{(v)}O_2 \quad <\text{Formula 5}>$$

In the above formula, M' includes any one from among a group which consists of Sb, Sn, In, Y, Zr, La, Sr, Ga, Mg, Mn, Ca, Sc, and Ni, or a mixed element of two or more kinds selected from among the group, and desirably, any one from among a group which consists of Y, Zr, and Ni, or a mixed element of two or more kinds selected from among the group.

M" is one or more element among Ca, Nb, W, Mg, Ti, B, Mo, Sc, or Zr, and $0 \leq a < 0.2$, $0 \leq b \leq 0.5$, $0 \leq c \leq 0.5$, $0 \leq s \leq 0.2$, and $0 \leq v \leq 0.2$.

According to an embodiment of the present invention, in the above Formula 5, it is desirable that $0 \leq a < 0.2$ and that M' include any one selected from among a group which consists of Sb, Sn, In, Zr, Y, Zr, Ca, Sc, and Ni, or a mixed element of two or more kinds among the group. The s and v may have concentration gradients which decrease going from the surface of the lithium transition metal oxide particle to the interior.

Moreover, according to an embodiment of the present invention, in the above Formula 1, $0 \leq a \leq 0.09$ is desirable, and $0 \leq a \leq 0.06$ may be more desirable.

In the above Formula 1, when a is above 0.09, especially when a is at least 0.2, the effect of coating the conductive oxide particles and composite particles (for example, YSZ) on the lithium transition metal oxide particle may have a lifetime property effect difference which is within about 10% when compared to the case of coating a different oxide (for example $ZrO_2$), and thus may not be remarkable. On the other hand, when, in the above Formula 1, a is 0.09 or less, especially when a is 0, the effect of coating the composite particles on the lithium transition metal oxide particle may display a remarkable difference of about 30% to about 70% in the lifetime property effect when compared to the case of coating a different oxide.

A Brunauer-Emmett-Teller (BET) specific surface area of the positive electrode active material according to an embodiment of the present invention of about 0.1 $m^2/g$ to about 10 $m^2/g$ is desirable. When the BET specific surface area is outside of the above range, the output property of the secondary battery may be degraded.

According to an embodiment of the present invention, the specific surface area of the positive electrode active material may be measured by using the BET method. For example, the specific surface area may be measured through a six-point BET method according to a nitrogen gas adsorption flow method, by using a porosimetry analyzer (Bell Japan Inc, Belsorp-II mini).

The present invention provides a preparation method for the positive electrode active material.

The preparation method for the positive electrode active material according to an embodiment of the present invention includes mixing and heat treating the lithium transition metal oxide particles and conductive oxide particles. The conductive oxide particles include any one selected from a group which consists of indium tin oxide (ITO) and antimony tin oxide (ATO), or include a mixture of two or more kinds from among the group. The positive electrode active material may include the conductive oxide particles which have a single-phase peak when measured by XRD analysis.

In the preparation method for the positive electrode active material according to an embodiment of the present invention, the composite particles may be further added during the mixing.

The composite particle may include any one selected from a group which consists of yttria stabilized zirconia (YSZ), gadolinia-doped ceria (GDC), LaSrGaMg (LSGM), LSM ($La_{(1-x)}Sr_xMnO_3$), CSZ, SSZ, and Ni—YSZ, or include a mixture of two or more kinds from among the group.

According to an embodiment of the present invention, the conductive oxide particles desirably include ATO, or a mixed particle of ATO and ITO, and the composite particle desirably includes any one selected from the group which consists of YSZ, CXZ, and SSZ, or a mixture of two or more kinds from among the group.

According to an embodiment of the present invention, the positive electrode active material more desirably includes ATO as the lithium transition metal oxide particle and conductive oxide particle, and YSZ as the composite particle.

When ATO is used as the conductive oxide particle and YSZ is used as the composite particle, the mixing (content) ratio of the ATO to YSZ may be a weight ratio of about 1:0.01 to about 1:1.15, or desirably about 1:0.1 to about 1:1.

According to an embodiment of the present invention, the heat treatment may be performed in a temperature range of about 100° C. to about 1200° C. for about 4 hours to about 24 hours.

According to a preparation method for the positive electrode active material in accordance with an embodiment of the present invention, forming the coating layer which includes the conductive oxide particles, or the conductive oxide particles and composite particles on the surface of the lithium transition metal oxide particle; including the conductive oxide particles, or both the conductive oxide particles and the composite particles in the interior of the lithium transition metal oxide particle; or including the conductive oxide particles, or the conductive oxide particles and composite particles in both the interior and exterior of the lithium transition metal oxide particle may have an effect on the heat treatment temperature and time during heat treatment.

According to an embodiment of the present invention, when heat treatment is performed in a temperature range of about 200° C. to about 800° C., desirably about 300° C. to about 600° C., the coating layer may be formed on the outer surface of the lithium transition metal oxide particle through the heat treatment.

Thus, even when heat treatment is performed in a temperature range of about 200° C. to about 800° C., the coating layer is formed on the lithium transition metal oxide particle surface, and the positive electrode active material may be obtained in which the coating layer includes the conductive oxide particles, or the conductive oxide particles and composite particles, and in which the conductive oxide particles and composite particles include a single-phase peak when measured by XRD analysis.

According to an embodiment of the present invention, some of the conductive oxide particles, or some of the conductive oxide particles and composite particles may be included in the interior of the lithium transition metal oxide particle, even when heat treating in a temperature range of about 200° C. to about 800° C. In such the case, the conductive oxide particles, or the conductive oxide particles and composite particles have concentration gradients which decrease going from the surface of the lithium transition metal oxide particle to the interior, and are included on the surface of the lithium transition metal oxide particle or in the interior of the lithium transition metal oxide particle, such that the conductive oxide particles, or the conductive oxide particles and composite particles may be composited with the lithium transition metal oxide particle to thereby form the composite material.

According to an embodiment of the present invention, when forming an outer coating layer on the lithium transition metal oxide particle, for example, when coating by using a spraying method of spinning at a high velocity, nanodispersion is possible, and thus the coating layer may be well formed as a single layer coating.

The thickness of the coating which is formed on the lithium transition metal oxide particle may change according to the amount of the conductive oxide particles. Consequently, when the amount of the conductive oxide particles exceeds the above range, the coating layer is in a shape of conductive oxide particles formed not as a single layer but instead as multiple layers, and thus undesirable with respect to output and internal resistance.

According to an embodiment of the present invention, when heat treatment is performed in a temperature range of, for example about 600° C. to about 1200° C., the positive electrode active material may be obtained which includes, in the interior of the lithium transition metal oxide particle, the conductive oxide particles, or the conductive oxide particles and composite particles.

Here, the conductive oxide particles, or the conductive oxide particles and composite particles have concentration gradients which decrease going from the surface of the lithium transition metal oxide particle to the interior, and may form a composite material by being composited with the lithium transition metal oxide particle. In this case, the conductive oxide particles, or the conductive oxide particles and composite particles may be present from the surface of the lithium transition metal oxide particle to about 500 nm or more into the interior.

According to an embodiment of the present invention, even when heat treatment is performed in a temperature range of about 600° C. to about 1200° C., the conductive oxide particles, or the conductive oxide particles and the composite particles may be present on the outer surface of the lithium transition metal oxide particle.

According to the preparation method for the positive electrode active material in accordance to an embodiment of the present invention, the transition metal oxide particle may include the lithium transition metal composite oxide particle of the above Formula 1, and the below s and v may have concentration gradients which decrease going from the surface of the lithium transition metal oxide particle to the interior.

According to the preparation method for the positive electrode active material in accordance with an embodiment of the present invention, the average particle diameter (D50) of the conductive oxide particles, or the conductive oxide particles and composite particles, which are used as surface modifiers, is about 1 nm to about 100 nm, desirably about 5 nm to about 80 nm, and more desirably about 10 nm to about 60 nm.

In the present invention, the average particle diameter (D50) of the conductive oxide particles, or the conductive oxide particles and composite particles may be defined as the particle diameter at the 50% position of the particle size distribution. The average particle diameter (D50) of the particles according to an embodiment of the present invention may be measured by using, for example, a laser diffraction method. The laser diffraction method may typically be used for measuring particles sizes from about the submicron range to about several mm, and highly reproducible and resolvable results may be obtained.

For example, in the method for measuring the average particle diameter (D50) of the ATO, ATO is dispersed in solution and introduced into a commercially available laser diffraction type particle size measurement instrument (for example, Microtrac MT 3000), and after emitting ultrasonic waves of about 28 kHz at about 60 W output, the average particle diameter (D50) at the 50% position of the particle size distribution in the measurement instrument may be calculated.

According to an embodiment of the present invention, the surface modifier may be used in an amount of about 50 to about 30000 ppm, desirably about 100 to about 20000 ppm, and more desirably about 400 to about 10000 ppm.

According to the preparation method of the positive electrode active material in accordance with an embodiment of the present invention, a dry mixing method or a wet mixing method (specifically, a nano-sol wet mixing method) may be used for the mixing.

In the preparation method according to an embodiment of the present invention, the dry mixing method may be performed by mixing with a shaker, by a mortar grinder mixing method, or by a mixing method which uses mechanical milling, and desirably, mechanical milling may be desirable for forming a uniform coating layer.

Describing in detail, the method of mixing with the shaker may be performed through hand mixing by shaking the lithium transition metal oxide particles and surface modifiers several times and thereby mixing.

The mortar grinder mixing method is a mixing method in which the mortar is used to uniformly mix the lithium transition metal oxide particles and surface modifiers.

The mechanical milling method may use, for example, a roll-mill, a ball-mill, a high energy ball mill, a planetary mill, a stirred ball mill, a vibrating mill, or a jet-mill to perform mixing of the lithium transition metal oxide particles and surface modifier through mechanical friction, and compressive stress may be applied mechanically by rotating at, for example, about 100 rpm to about 1000 rpm.

Moreover, to reduce the chance of the lithium transition metal oxide particles being damaged by the solution, it is desirable to use the dry mixing method or, considering the uniformity of the coating, the nano-sol wet mixing method.

In the preparation method according to an embodiment of the present invention, in the nano-sol wet mixing method, after forming a colloidal inorganic nano-sol by, for example, adding solvent and dispersing agent to a purified inorganic precursor and then agitating, surface treatment may be performed on the lithium oxide by adding the surface modifier and lithium transition metal oxide particles to the nano-sol. The nano-sol wet mixing method may advantageously improve the uniformity of the coating.

The present invention provides a positive electrode which includes the positive electrode active material.

The positive electrode may be manufactured by using a typical method which is known in the field. For example, the positive electrode may be manufactured by mixing and agitating solvent and, as needed, binder, conductive agent, or dispersant, with the positive electrode active material to prepare slurry, coating and pressing the slurry on a metallic current collector, and then drying.

According to an embodiment of the present invention, with respect to toughness, the positive electrode active material porous particles are strong, and thus especially desirable to be included in a porous positive electrode.

The metallic current collector is a metal with high conductivity, and any metallic current collector may be used to which the slurry of the positive electrode active material may be easily attached, and which is unreactive in the voltage range of the battery. Non-limiting examples of the positive electrode current collector include aluminum, nickel, or foils which are produced from mixtures thereof.

The solvent for forming the positive electrode includes organic solvents such as N-methyl pyrrolidone (NMP), dimethyl formamide (DMF), acetone, dimethyl acetamide, etc., or water, and such solvents may be used alone or by mixing two or more kinds. An amount of solvent is sufficient which may dissolve and disperse the positive electrode active material, binder, and conductive agent, taking into consideration the coating thickness and production yield of the slurry.

As the binder, various types of binder polymer may be used, including poly(vinylidene fluoride-hexafluoropropylene) copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPMD), sulfonated EPDM, styrene butadiene rubber (SBR), fluorocarbon rubber, polymers in which the hydrogen in such polymers was substituted by Li, Na, Ca, etc., or various copolymers, etc.

The conductive agent is not particularly limited and may be any which is conductive and does not cause a chemical change to the battery, and, for example, graphite such as natural graphite or synthetic graphite, carbon blacks such as carbon black, acetylene black, ketjen black, channel black, furnace black, lamp black, or thermal black, conductive fibers such as carbon fiber or metal fiber, conductive tubes such as carbon nanotube, metal powders such as fluorocarbon, aluminum, or nickel powder, conductive whiskers such as zinc oxide or potassium titanate, conductive oxides such as titanium oxide, conductive materials such as polyphenylene derivatives, etc., may be used as the conductive agent.

As the dispersant, an aqueous dispersant or an organic dispersant such as N-methyl-2-pyrrolidone may be used.

The present invention may provide the secondary battery which includes the positive electrode, a negative electrode, and a separator which is disposed between the positive electrode and negative electrode.

As a negative electrode active material which is used in the negative electrode according to an embodiment of the present invention, carbon material, lithium metal, silicon, tin, etc., from which lithium ions may be occluded or released, may typically be used. Desirably, the carbon material may be used, and both low-crystalline carbon or high-crystalline carbon may be used as the carbon material. Soft carbon and hard carbon are representative of the low-crystalline carbon, and high temperature fired carbon such as natural graphite, kish graphite, pyrolytic graphite, mesophase pitch based carbon fiber, meso-carbon microbeads, mesophase pitches, petroleum or coal tar pitch derived cokes, etc., are representative of the high-crystalline carbon.

The negative electrode current collector is typically made to a thickness of about 3 µm to about 500 µm. Such the negative electrode is not particularly limited and may be any which is conductive and does not cause chemical change to the battery, and, for example, copper, stainless steel, aluminum, nickel, titanium, fired carbon, copper or stainless steel whose surface is surface treated with carbon, nickel, titanium, silver etc., or aluminum-cadmium alloy may be used as the negative electrode. Moreover, as with the positive electrode current collector, fine ridges and grooves may be formed on the surface to strengthen the bonding strength of the negative electrode active material, and the negative electrode current collector may be used in various forms, such as, film, sheet, foil, net, porous material, foam, non-woven fabric, etc.

As with the positive electrode, the binder and conductive agent which are typically used in the field may be used in the negative electrode. After preparing negative electrode active material slurry by mixing and agitating the negative electrode active material and the additives, the negative electrode active material slurry may be coated and pressed on the current collector to thereby manufacture the negative electrode.

As the separator, typical porous polymer films which are conventionally used as the separator, for example, porous polymer films which are produced from polyolefin-based polymers such as ethylene homopolymer, propylene homopolymer, ethylene-butene copolymer, ethylene-hexene copolymer, or ethylene-methacrylate copolymer may be used, alone or through lamination thereof, or typical porous nonwoven fabric, for example, nonwoven fabric made of high melting point glass fiber or polyethylene terephthalate fiber may be used, but the separator is not limited thereto.

As the lithium salt, which may be included as the electrolyte which is used in the present invention, any which are typically used in the electrolyte for use in the lithium secondary battery may be used without limitation and, for example, the negative ion of the lithium salt may be any one selected from a group which consists of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The electrolyte which is used in the present invention may be an organic liquid electrolyte, an inorganic liquid electrolyte, a solid polymer electrolyte, a gel type polymer electrolyte, a solid inorganic electrolyte, a molten type inorganic electrolyte, etc., which may be used in manufacturing the lithium secondary battery, but is not limited thereto.

The outer appearance of the lithium secondary battery of the present invention is not particularly limited, but may be a cylindrical type which uses a can, a polygonal type, a pouch type, a coin type, etc.

The lithium secondary battery according to the present invention may not only be used in battery cells which are used as a power source for small devices, but may also desirably be used as a unit battery in a mid- to large-scale battery module which includes multiple battery cells.

Exemplary embodiments of the mid- to large-scale device may include electric vehicles, hybrid electric vehicles, plug-in hybrid electric vehicles, power storage systems, etc., but are not limited thereto.

Hereinafter, in order to describe the present invention in more detail, detailed description will be provided along with embodiments. However, the embodiments may be modified in various forms, and the scope of the present invention should not be construed as being limited to the embodiments given below. Embodiments of the present invention are provided to better describe the present invention to those with ordinary skill in the art.

EXAMPLES

Hereinafter, further description is given by using examples and experimental examples, but the present invention is not limited by the examples and experimental examples.

Performance Evaluation According to Material Properties of Conductive Oxide Particles and Composite Particles Example 1 (Single Layer Coating)

<Preparing Positive Electrode Active Material>

100 g of $LiNi_{0.78}Mn_{0.11}Co_{0.11}O_2$ and 5 g of 40 nm $(SnO_2)_x(Sb_2O_3)_y$ (ATO) nano-sol (methoxy propanol 90%, ATO 10%, x=0.9 y=0.05) were placed into a beaker and then ethanol was added such that the total solids content was about 10%. After placing the obtained mixed solution into MPO5 (Multi-Purpose, Japan Coke Industry) and spray coating and drying for about 10 minutes, drying was performed in an oven for 12 hours at about 130° C. After drying and then performing heat treatment for about 10 hours at about 400° C., grinding and sieving were performed to thereby obtain positive electrode active material.

<Manufacturing Positive Electrode>

94 wt % of the positive electrode active material which was obtained in the above Example 1, 3 wt % of carbon black as conductive agent, and 3 wt % of polyvinylidene fluoride (PVdF) as binder was added to a solvent, N-methyl-2-pyrrolidone (NMP), to thereby prepare a positive electrode mixture slurry. The positive electrode mixture slurry was coated on an aluminum (Al) thin film, which is a positive electrode current collector having thickness of about 20 μm, and after drying to produce a positive electrode, roll pressing was performed to thereby manufacture the positive electrode.

<Manufacturing Negative Electrode>

96.3 wt % of carbon powder as the negative electrode active material, 1.0 wt % of super-p as conductive agent, and 1.5 wt % and 1.2 wt % respectively of styrene butadiene rubber (SBR) and carboxymethyl cellulose (CMC) were mixed and added to a solvent, NMP, to thereby prepare a negative electrode active material slurry. The negative electrode active material was coated on a copper (Cu) thin film, which is a negative electrode current collector having thickness of about 10 μm, and after drying to produce a negative electrode, roll pressing was performed to thereby manufacture the negative electrode.

<Preparing Non-Aqueous Electrolyte Solution>

Meanwhile, 1 M of $LiPF_6$ non-aqueous electrolyte solution was prepared as electrolyte by adding $LiPF_6$ to non-aqueous electrolyte solvent which was prepared by mixing ethylene carbonate and dimethyl carbonate at a volumetric ratio of about 30:70.

<Manufacturing Lithium Secondary Battery>

After the positive electrode and negative electrode, which were manufactured as such, and the mixed separator of polyethylene and polypropylene, after intercalation thereof, were manufactured into a polymer type battery through a typical method, manufacture of the lithium secondary battery was completed by injecting the prepared above non-aqueous electrolyte solution.

Example 2

Other than using ATO instead of ITO in the above Example 1, the positive electrode active material and lithium secondary battery were obtained through performing the same method as the above Example 1.

Example 3

Other than using ITO and ATO by mixing at a 1:1 weight ratio instead of ATO in the above Example 1, the positive electrode active material and lithium secondary battery were obtained through performing the same method as the above Example 1.

Example 4

Other than using ATO and YSZ by mixing at a 1:1 weight ratio instead of ATO in the above Example 1, the positive electrode active material and lithium secondary battery were obtained through performing the same method as the above Example 1.

Example 5

Other than using ITO and YSZ by mixing at a 1:1 weight ratio instead of ATO in the above Example 1, the positive electrode active material and lithium secondary battery were obtained through performing the same method as the above Example 1.

Example 6

Other than using $Li_{1.05}Ni_{0.8}Mn_{0.1}Co_{0.1}O_2$ (Li/M=1.05) instead of $LiNi_{0.78}Mn_{0.11}Co_{0.11}O_2$ in the above Example 1, the positive electrode active material and lithium secondary battery were obtained through performing the same method as the above Example 3.

Example 7

Other than using ATO and YSZ by mixing at a 1:1 weight ratio instead of ATO and using $Li_{1.05}Ni_{0.8}Mn_{0.1}Co_{0.1}O_2$ (Li/M=1.05) instead of $LiNi_{0.78}Mn_{0.11}Co_{0.11}O_2$ in the above Example 1, the positive electrode active material and lithium secondary battery were obtained through performing the same method as the above Example 6.

Example 8

Other than using ITO and YSZ by mixing at a 1:1 weight ratio instead of ATO and using $Li_{1.05}Ni_{0.8}Mn_{0.1}Co_{0.1}O_2$ (Li/M=1.05) instead of $LiNi_{0.78}Mn_{0.11}Co_{0.11}O_2$ in the above Example 1, the positive electrode active material and lithium secondary battery were obtained through performing the same method as the above Example 6.

Example 9 (Interior and Exterior)

Other than performing the heat treatment at 900° C. for 6 hours, the positive electrode active material which includes ATO in the interior and exterior of the $LiNi_{0.78}Mn_{0.11}Co_{0.11}O_2$, and the lithium secondary battery were obtained by performing the same method as the above Example 1.

Comparative Example 1 (Multi-Layered Coating)

Other than using 50 g of 40 nm ATO $((SnO_2)_x(Sb_2O_3)_y$, x=0.9, y=0.05) nano-sol (methoxy propanol 90%, ATO 10%) in the above Example 1, the positive electrode active material which includes a multi-layered ATO coating layer, and the lithium secondary battery were obtained by performing the same method as the above Example 1.

Comparative Example 2

Other than using ITO instead of ATO in the above Comparative Example 1, the positive electrode active material and lithium secondary battery were obtained by performing the same method as the above Comparative Example 1.

Comparative Example 3

Other than using $TiO_2$ instead of ATO $((SnO_2)_x(Sb_2O_3)y$, x=0.9, y=0.05), the positive electrode active material and lithium secondary battery were obtained by performing the same method as the above Example 1.

Comparative Example 4

Other than not adding ATO in the above Example 1, the positive electrode active material and lithium secondary battery were obtained by performing the same method as the above Example 1.

Comparative Example 5

Other than using $Li_{1.2}Ni_{0.8}Mn_{0.1}Co_{0.1}O_2$ (Li/M=1.2) instead of $LiNi_{0.78}Mn_{0.11}Co_{0.11}O_2$(Li/M=1), the positive electrode active material and lithium secondary battery were obtained by performing the same method as the above Example 1.

Comparative Example 6

Other than using $Li_{1.2}Ni_{0.8}Mn_{0.1}Co_{0.1}O_2$ (Li/M=1.2) instead of $LiNi_{0.78}Mn_{0.11}Co_{0.11}O_2$(Li/M=1), the positive electrode active material and lithium secondary battery were obtained by performing the same method as the above Example 9.

Comparative Example 7

Other than using $TiO_2$ instead of ATO $((SnO_2)_x(Sb_2O_3)_y,$ x=0.9 y=0.05), the positive electrode active material and lithium secondary battery were obtained by performing the same method as the above Example 9.

Compositions of the positive electrode active material of the above Examples 1 to 9 and Comparative Examples 1 to 7 may be organized such as in the following Table 1:

TABLE 1

| | Exterior/Interior | L/M | Conductive Oxide | Composite Particle (YSZ) |
|---|---|---|---|---|
| Example 1 | Exterior (single layer, 10 nm) | L/M = 1 | ATO | X |
| Example 2 | Exterior (single layer, 10 nm) | L/M = 1 | ITO | X |
| Example 3 | Exterior (single layer, 10 nm) | L/M = 1 | ATO and ITO | X |
| Example 4 | Exterior (single layer, 10 nm) | L/M = 1 | ATO | ○ |
| Example 5 | Exterior (single layer, 10 nm) | L/M = 1 | ITO | ○ |
| Example 6 | Exterior (single layer, 10 nm) | L/M = 1.05 | ATO and ITO | X |
| Example 7 | Exterior (single layer, 10 nm) | L/M = 1.05 | ATO | ○ |
| Example 8 | Exterior (single layer, 10 nm) | L/M = 1.05 | ITO | ○ |
| Example 9 | Interior/Exterior (single layer, 10 nm)) | L/M = 1 | ATO | X |
| Comparative Example 1 | Exterior (multi-layered, 40 nm) | L/M = 1 | ATO | X |
| Comparative Example 2 | Exterior (multi-layered, 40 nm) | L/M = 1 | ITO | X |
| Comparative Example 3 | Exterior (single layer, 10 nm) | L/M = 1 | $TiO_2$ | X |
| Comparative Example 4 | Exterior (single layer, 10 nm) | L/M = 1 | X | X |
| Comparative Example 5 | Exterior (single layer, 10 nm) | L/M = 1 | ATO | X |
| Comparative Example 6 | Exterior (single layer, 10 nm) | L/M = 1 | ATO | X |
| Comparative Example 7 | Exterior (single layer, 10 nm) | L/M = 1 | $TiO_2$ | X |

Experimental Example 1: SEM Micrographs

SEM micrographs of each of the positive electrode active materials which were prepared in the above Examples 1 and 2, and Comparative Examples 1 to 4 were observed, and results thereof are shown in Table 2 and FIGS. 3 to 7.

TABLE 2

| | Oxide Coating Layer | Average Particle Diameter of Oxide (nm) | Coating Layer Thickness (Single Layer/Multi-layered |
|---|---|---|---|
| Example 1 | ATO | 10 nm | 10 nm (Single layer) |
| Example 2 | ITO | 10 nm | 10 nm (Single layer) |
| Comparative Example 1 | ATO | 10 nm | 40 nm (Multi-layered) |
| Comparative Example 2 | ITO | 10 nm | 40 nm (Multi-layered) |
| Comparative Example 3 | $TiO_2$ | 10 nm | 10 nm (Single layer) |
| Comparative Example 4 | None | 0 | 0 |

As illustrated in Table 2 and FIGS. 3 to 7, when including the conductive oxide coating layer on the lithium transition metal oxide particle according to an embodiment of the present invention, it may be known that a single layer is formed which has a thickness of the coating layer of about 10 nm which is similar to the average particle diameter of the conductive oxide particle.

Conversely, in the case of Comparative Examples 1 to 3, it may be known that a plurality of layers is formed which has a thickness of the coating layer of about 40 nm which is about 4 times the average particle diameter of the conductive oxide particle.

Experimental Example 2: X-Ray Diffraction Analysis

X-ray diffraction analysis was performed on the positive electrode active material which was prepared in Examples 1 and 2, and Comparative Examples 1 to 4. Results thereof are shown in FIGS. 9 and 10.

Figure 8:
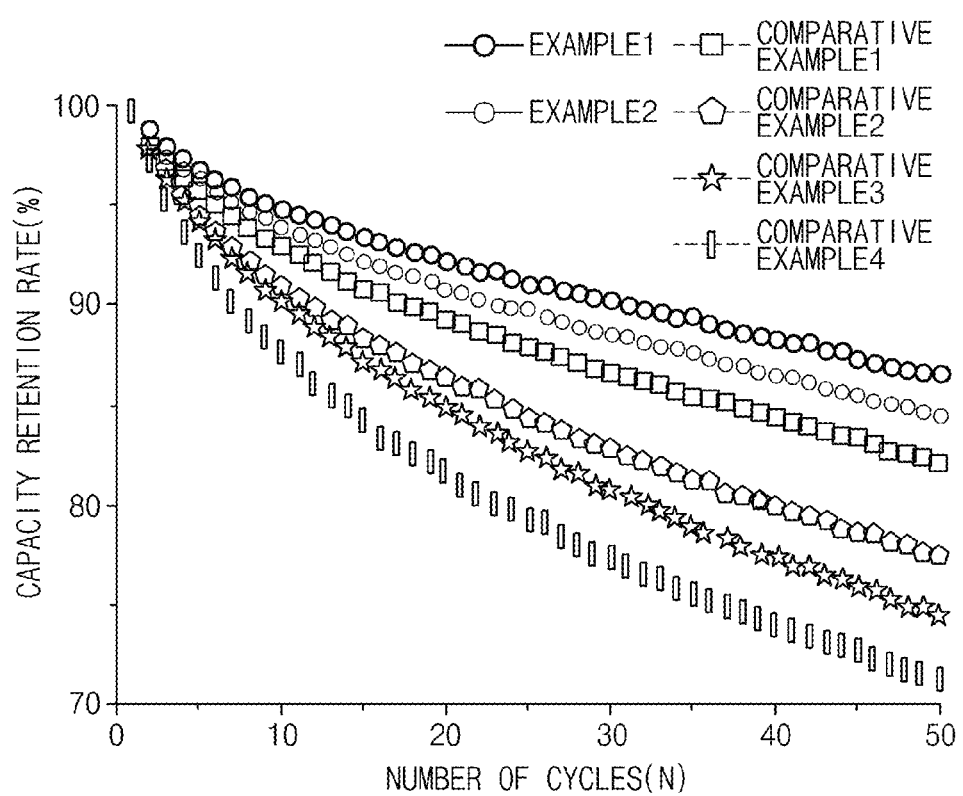
FIG. 8 is a graph illustrating lifetime properties of lithium secondary batteries which were manufactured in Examples 1 and 2, and Comparative Examples 1 to 4.

In order to comparatively analyze XRD phases of ITO and ATO which are included in the positive electrode active material of the present invention, XRD diffraction measurements were done on the positive electrode active material by using Cu (Kα radiation), and results thereof are illustrated in FIG. 8.

Target: Cu (Kα radiation) graphite monochromator
Slit: divergence slit=1 degree, receiving slit=0.1 mm, scatter slit=1 degree
Measurement area and step angle/measurement time: 20.0 degrees<2θ<80 degrees, 4 degrees/1 minute (=0.2 degrees/3 seconds), here 2θ (theta) represents the diffraction angle.

Figure 9:
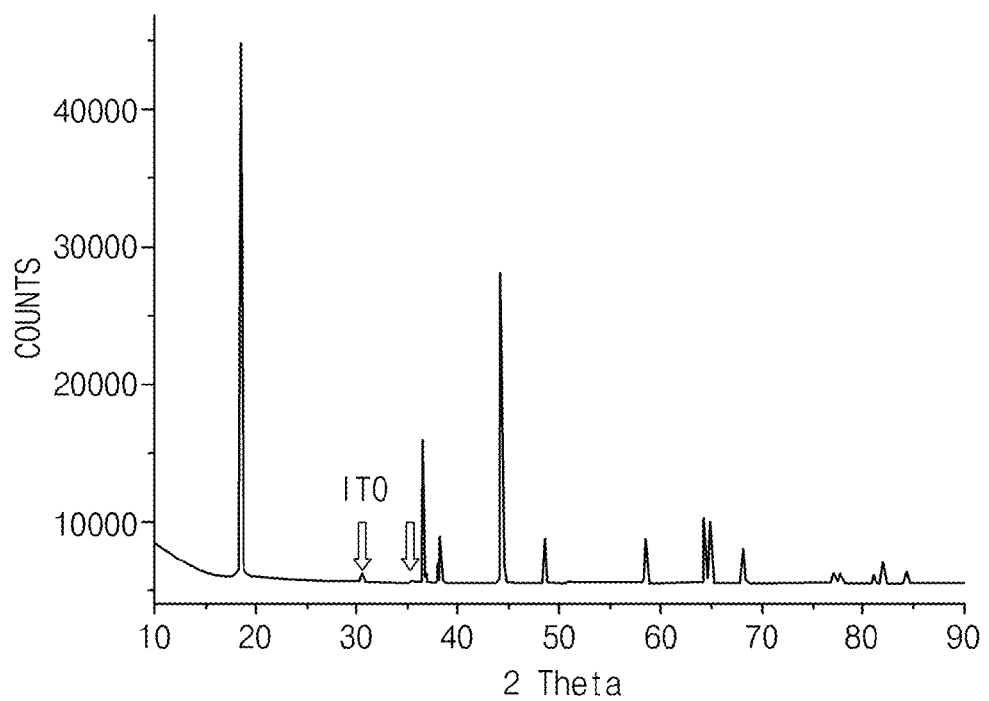
FIG. 9 is a graph illustrating X-ray diffraction (XRD) analysis results of indium tin oxide (ITO) transition metal oxide particles which are included in a positive electrode active material of the present invention.
Figure 10:
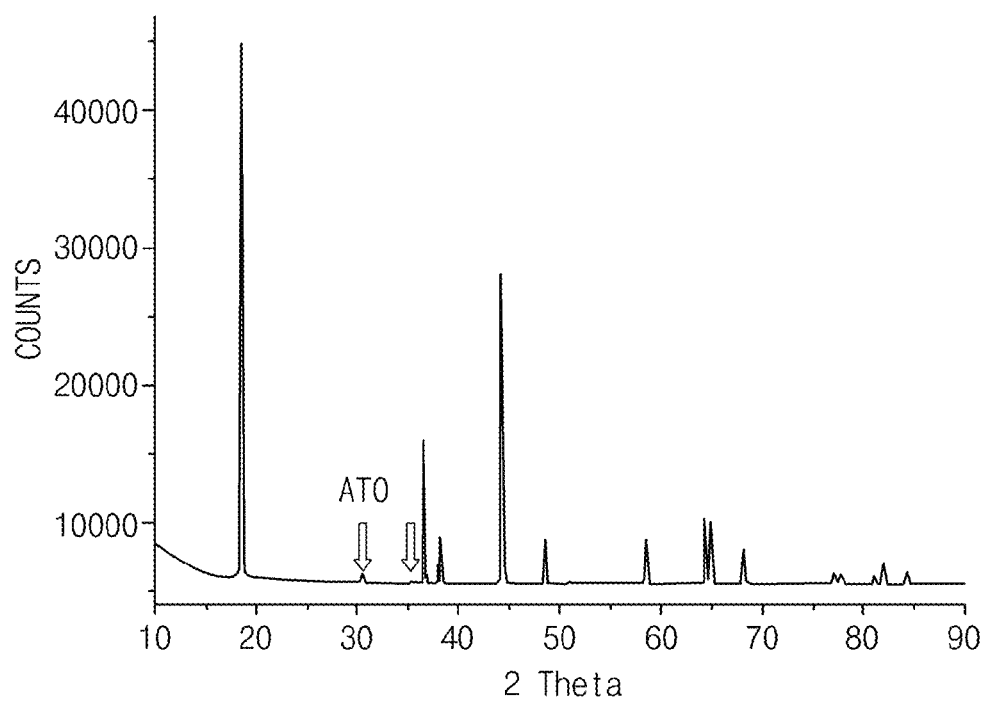
FIG. 10 is a graph illustrating XRD analysis results of antimony tin oxide (ATO) transition metal oxide particles which are included in a positive electrode active material.

Observing FIGS. 9 and 10, it was verified that a single phase ITO peak or ATO peak, the 2θ of which exists at about 28 to about 35 degrees, appears in the positive electrode active material.

Experimental Example 3: Cycle Property Evaluation 1

In order to find the relative efficiency of the lithium secondary batteries, which were obtained in Examples 1 and 2, and Comparative Examples 1 to 4, according to number of cycles, an electrochemical evaluation experiment was performed as follows.

In detail, one cycle of charging was performed on the lithium secondary batteries which were obtained in Examples 1 and 2, and Comparative Examples 1 to 4 by charging at 45° C. and constant current of 1 C until voltage of 4.2 V was reached, and then charging with a constant voltage of 4.2 V until charging current of 0.05 mAh was reached. Later, after leaving as it is for 20 minutes, the lithium secondary battery was discharged at constant current of 2 C until voltage of 3.0 V was reached. Such was repeated for 1 to 5 cycles.

As may be seen in the above FIG. 8, as number of cycles increases, Examples 1 and 2 of the present example are found to have improved capacity retention rates compared to those of Comparative Examples 1 to 4.

For example, when, as in Examples 1 and 2, the conductive oxide coating layer was formed as a single layer on the exterior of the lithium transition metal oxide particles, capacity retention rate was improved by at least 10% for the 50th cycle when compared to Comparative Examples 1 and 2 in which the coating layer was formed as a plurality of layers.

Even when the coating layer was formed as a single layer on the lithium transition metal oxide particles, when ATO or ITO was formed, an improvement of about 16% was found when compared to Comparative Example 3 in which $TiO_2$ was formed.

In the case of Comparative Example 4, in which the coating layer of conductive oxide was not formed on the lithium transition metal oxide, a remarkable decrease of about 23% was observed when compared to Examples 1 and 2 of the present invention.

Performance Evaluation According to Mixing Ratio of Conductive Oxide Particles and Composite Particles

Example 10

Other than mixing ATO and YSZ at a weight ratio of about 1:0.01 instead of about 1:1 in the above Example 4, the positive electrode active material and lithium secondary battery were obtained by performing the same method as the above Example 4.

Example 11

Other than mixing ATO and YSZ at a weight ratio of about 1:0.1 instead of about 1:1 in the above Example 4, the positive electrode active material and lithium secondary battery were obtained by performing the same method as the above Example 4.

Example 12

Other than mixing ATO and YSZ at a weight ratio of about 1:0.5 instead of about 1:1 in the above Example 4, the positive electrode active material and lithium secondary battery were obtained by performing the same method as the above Example 4.

Example 13

Other than mixing ATO and YSZ at a weight ratio of about 1:1.5 instead of about 1:1 in the above Example 4, the positive electrode active material and lithium secondary battery were obtained by performing the same method as the above Example 4.

Reference Example 1

Other than mixing ATO and YSZ at a weight ratio of about 1:0.005 instead of about 1:1 in the above Example 4, the positive electrode active material and lithium secondary battery were obtained by performing the same method as the above Example 4.

Reference Example 2

Other than mixing ATO and YSZ at a weight ratio of about 1:2 instead of about 1:1 in the above Example 4, the positive electrode active material and lithium secondary battery were obtained by performing the same method as the above Example 4.

Experimental Example 4: Cycle Property Evaluation 2

In order to find the relative efficiency of the lithium secondary batteries, which were obtained in Examples 4 and 10 to 13, and Reference Example 1 and 2, according to number of cycles, an electrochemical evaluation experiment was performed as follows, and results thereof are shown in the following Table 3.

TABLE 3

|  | ATO:YSZ | Initial Capacity (Relative) | Capacity After 30 Cycles (%) | Capacity After 50 Cycles (%) |
| --- | --- | --- | --- | --- |
| Example 4 | 1:1 | 100 | 93.5 | 89.2 |
| Example 10 | 1:0.01 | 100 | 90.1 | 86.3 |
| Example 11 | 1:0.1 | 100 | 92.5 | 88.3 |
| Example 12 | 1:0.5 | 100 | 93.3 | 89.8 |
| Example 13 | 1:1.5 | 100 | 93.2 | 89.1 |
| Example 8 | 1:0.005 | 100 | 89.5 | 85.1 |
| Example 9 | 1:2 | 97 | 93.3 | 89.1 |

Referring to the above Table 3, in the case of Examples 4 and 10 to 13, in which the conductive oxide particles (ATO) and composite particles (YSZ) were added at a 1:0.1 to 1:1.15 ratio, initial capacity was excellent and capacity retention rate after tens of cycles was also excellent, and thus superb cycle properties were observed, but in the case of Reference Example 1 and 2 which deviate from the above range of ratios, it was observed that cycle properties were degraded or initial capacity was low. In particular, initial capacity was found to be degraded due to effects such as a coating layer becoming excessively thick when the ratio of the composite particles was high.

Therethrough, it was observed that in order to satisfy both initial capacity properties and cycle properties, it is advantageous to mix the conductive oxide particles and composite particles at a ratio of about 1:0.01 to about 1.15, and furthermore, in order to obtain an even better effect, advantageous to mix at a ratio of about 1:0.1 to about 1:1.

Evaluation According to Mixing Ratio of Mixed Conductive Oxide Particles

Example 14

Other than mixing ITO and ATO at a weight ratio of about 1:0.01 instead of about 1:1 in the above Example 3, the positive electrode active material and lithium secondary battery were obtained by performing the same method as the above Example 3.

Example 15

Other than mixing ITO and ATO at a weight ratio of about 1:0.1 instead of about 1:1 in the above Example 3, the positive electrode active material and lithium secondary battery were obtained by performing the same method as the above Example 3.

Example 16

Other than mixing ITO and ATO at a weight ratio of about 1:0.5 instead of about 1:1 in the above Example 3, the positive electrode active material and lithium secondary battery were obtained by performing the same method as the above Example 3.

Reference Example 3

Other than mixing ITO and ATO at a weight ratio of about 1:0.005 instead of about 1:1 in the above Example 3, the positive electrode active material and lithium secondary battery were obtained by performing the same method as the above Example 3.

Reference Example 4

Other than mixing ITO and ATO at a weight ratio of about 1:2 instead of about 1:1 in the above Example 3, the positive electrode active material and lithium secondary battery were obtained by performing the same method as the above Example 3.

Experimental Example 5: Cycle Property Evaluation 3

In order to find the relative efficiency of the lithium secondary batteries, which were obtained in Examples 3 and 14 to 16, and Reference Example 3 and 4, according to number of cycles, an electrochemical evaluation experiment was performed as follows, and results thereof are shown in the following Table 4.

TABLE 4

| | ITO:ATO | Initial Capacity (Relative) | Capacity After 30 Cycles (%) | Capacity After 50 Cycles (%) |
|---|---|---|---|---|
| Example 3 | 1:1 | 100 | 91.4 | 87.6 |
| Example 14 | 1:0.01 | 100 | 90.2 | 86.1 |
| Example 15 | 1:0.1 | 100 | 90.5 | 86.2 |
| Example 16 | 1:0.5 | 100 | 91.0 | 87.1 |
| Comparative Example 10 | 1:0.005 | 100 | 90.1 | 86.0 |
| Comparative Example 11 | 1:2 | 98 | 91.1 | 87.5 |

Referring to the above Table 4, in the case of Examples 3 and 14 to 16, in which the conductive oxide particles (ITO and ATO) are added at a ratio of about 1:0.1 to 1:1, initial capacity was excellent and capacity retention, even after tens of cycles, was excellent, and thus superb cycle properties were observed, but in the case of Reference Example 3 and 4 which deviate from the above range of ratios, it was observed that cycle properties were degraded or initial capacity was low. In particular, when ratio of ATO was high, initial capacity was found to be degraded due to effects such as the coating layer becoming excessively thick or mixing becoming non-uniform.

Therethrough, it was observed that in order to satisfy both initial capacity properties and cycle properties, it is advantageous to mix the conductive oxide particles and composite particles at a ratio of about 1:0.01 to about 1:1, and furthermore, in order to obtain an even better effect, it is advantageous to mix at a ratio of about 1:0.1 to about 1:1.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A positive electrode active material, comprising:
   lithium transition metal oxide particles;
   conductive oxide particles; and
   composite particles,
   wherein the conductive oxide particles include antimony tin oxide (ATO) or a mixture of indium tin oxide (ITO) and ATO,
   the conductive oxide particles and the composite particles are doped in the lithium transition metal oxide particles; or coated on the lithium transition metal oxide particles; or doped in and coated on the lithium transition metal oxide particles,
   wherein the mixing ratio by weight of the conductive oxide particles to the composite particles is 1:0.01 to 1:1.5, and
   the conductive oxide particles and the composite particles include a single-phase peak when measured by X-ray diffraction (XRD) analysis.

2. The positive electrode active material of claim 1, wherein a coating layer which includes the conductive oxide particles and composite particles is formed on an outer surface of the lithium transition metal oxide particle.

3. The positive electrode active material of claim 2, wherein the coating layer further comprises an oxide which includes one or more of calcium (Ca), niobium (Nb), tungsten (W), magnesium (Mg), titanium (Ti), boron (B), molybdenum (Mo), scandium (Sc), or zirconium (Zr).

4. The positive electrode active material of claim 2, wherein the conductive oxide particles include those which have an average particle diameter of 1 nm to 100 nm.

5. The positive electrode active material of claim 1, wherein the conductive oxide particles and composite particles are included in the interior of the lithium transition metal oxide particle, and thus have
   concentration gradients in which the concentrations of the conductive oxide particles and composite particles decrease going from the surface of the lithium transition metal particle to the interior, and the conductive oxide particles and composite particles are composited with the lithium transition metal particle to form a composite material.

6. The positive electrode active material of claim 5, wherein:
   the concentrations of the conductive oxide particles and composite particles are at least about 20% higher in an exterior bulk of the lithium transition metal particle than in an interior bulk; and the interior bulk is the center and adjacent regions of the lithium transition metal oxide particle, and includes about 50% of the total number of transition metal atoms which are in the particle.

7. The positive electrode active material of claim 5, wherein the conductive oxide particles and composite particles are included, in a direction going from the surface of the particle to the interior, within a thickness range of about 0.0001 to about 80% of the particle radius.

8. The positive electrode active material of claim 1, wherein:
a coating layer which includes the conductive oxide particles and composite particles is formed on an outer surface of the lithium transition metal oxide particle; and
the conductive oxide particles and composite particles are included in the interior of the lithium transition metal oxide particle, and thus have concentration gradients which decrease going from the surface to the interior, and are composited with the lithium transition metal particle to form a composite material.

9. The positive electrode active material of claim 8, wherein the coating layer further comprises an oxide which includes one or more of calcium (Ca), niobium (Nb), tungsten (W), magnesium (Mg), titanium (Ti), boron (B), molybdenum (Mo), scandium (Sc), or zirconium (Zr).

10. The positive electrode active material of claim 8, wherein the conductive oxide particles include those which have an average particle diameter of 1 nm to 100 nm.

11. The positive electrode active material of claim 1, wherein the conductive oxide particles are included in an amount of 50 to 30000 ppm with respect to the entirety of the positive electrode active material.

12. The positive electrode active material of claim 1, wherein the composite particle includes any one selected from a group which consists of yttria stabilized zirconia (YSZ), gadolinia-doped ceria (GDC), lanthanum strontium gallate magnesite (LSGM), lanthanum strontium manganite (LSM), Ca doped zirconia or calcia stabilized zirconia (CSZ), Sc doped zirconia (SSZ), and Ni—YSZ, or a mixture of at least two thereof.

13. The positive electrode active material of claim 12, wherein oxygen vacancies are present in proportion to the amount of the element yttrium (Y).

14. The positive electrode active material of claim 12, wherein the YSZ is $Zr_{(1-x)}Y_xO_{2-x/2}(0.01 \leq x \leq 0.30)$.

15. The positive electrode active material of claim 12, wherein the conductive oxide particles include ATO and the composite particles include YSZ.

16. The positive electrode active material of claim 1, wherein the conductive oxide is a mixed oxide of indium tin oxide and antimony tin oxide which are included at a weight ratio of 1:0.01 to 1:1.

17. The positive electrode active material of claim 1, wherein the antimony tin oxide includes any one of compounds represented by the below Formula 1 or 2, or a mixture thereof:

$(SnO_2)_x(Sb_2O_3)_y$          <Formula 1> where, x and y satisfy x+y=1, 0<y/x≤2, 0.6≤x≤0.99, and 0.001≤y≤0.2; and

$(SnO_2)_x(Sb_2O_5)_y$          <Formula 2> where, x and y satisfy x+y=1, 0<y/x≤2, 0.6≤x≤0.99, and 0.001≤y≤0.2.

18. The positive electrode active material of claim 1, wherein the indium tin oxide includes any one of compounds represented by the below Formula 3 or 4, or a mixture thereof:

$(InO_2)_a(SnO_2)_b$          <Formula 3> where, a and b satisfy a+b=1, 0<b/a≤2, 0.6≤a≤0.99, and 0.001≤b≤0.2; and

$(InO_2)_a(SnO_2)_b$          <Formula 4> where, a and b satisfy a+b=1, 0<b/a≤2, 0.6≤a≤0.99, and 0.001≤b≤0.2.

19. The positive electrode active material of claim 1, wherein the lithium transition metal oxide particle includes the compound of Formula 5:

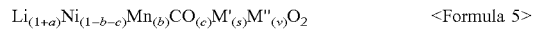
$Li_{(1+a)}Ni_{(1-b-c)}Mn_{(b)}CO_{(c)}M'_{(s)}M''_{(v)}O_2$          <Formula 5> where,
M' includes any one selected from among the group which consists of antimony (Sb), tin (Sn), indium (In), yttrium (Y), zirconium (Zr), lanthanum (La), strontium (Sr), gallium (Ga), magnesium (Mg), manganese (Mn), calcium (Ca), scandium (Sc), and nickel (Ni), or includes a mixed element of at least two thereof, or an oxide thereof;
M" includes one or more element among calcium (Ca), niobium (Nb), tungsten (W), magnesium (Mg), titanium (Ti), boron (B), molybdenum (Mo), scandium (Sc), or zirconium (Zr), or oxides thereof; and
a, b, c, s, and v satisfy 0≤a<0.2, 0≤b≤0.5, 0≤c≤0.5, 0≤s≤0.2, and 0≤v≤0.2, respectively.

20. The positive electrode active material of claim 19, wherein, in Formula 5, s and v have concentration gradients which decrease going from the surface of the lithium transition metal oxide particle to the interior.

21. The positive electrode active material of claim 1, wherein the average particle diameter is 3 m to 30 μm.

22. The positive electrode active material of claim 1, wherein the compressive strength is 10 to 500 MPa under pressure of 0.5 to 10 mN.

23. A method for preparing positive electrode active material of claim 1, the method comprising:
mixing lithium transition metal oxide particles, conductive oxide particles, and composite particles; and
heat treating the mixed particles,
wherein the conductive oxide particles include antimony tin oxide (ATO) or a mixture of indium tin oxide (ITO) and ATO, and
the conductive oxide particles and the composite particles include a single-phase peak when measured by XRD analysis.

24. The method of claim 23, wherein:
the mixing is dry mixing or wet mixing; and
the conductive oxide particles and composite particles are coated on the surface of the lithium transition metal oxide particle.

25. The method of claim 24, wherein the coating layer is formed through a spraying method.

26. The method of claim 23, wherein the heat treatment is performed in a temperature range of 100° C. to 1200° C.

27. The method of claim 23, wherein the heat treatment is performed in a temperature range of 200° C. to 800° C.

28. The method of claim 27, wherein, through the heat treatment, the conductive oxide particles and composite particles form a coating layer which is a single layer on the surface of the lithium transition metal oxide particle.

29. The method of claim 23, wherein the heat treatment is performed in a temperature range of 600° C. to 1200° C.

30. The method of claim 29, wherein:
through the heat treatment, the conductive oxide particles and composite particles are included in the interior of the lithium transition metal oxide particle, and thus have concentration gradients in which the concentrations of the conductive oxide particles and composite particles decrease going from the surface of the lithium transition metal particle to the interior, and the conductive oxide particles and composite particles are composited with the lithium transition metal particle.

* * * * *